United States Patent [19]

Pohjola

[11] Patent Number: 4,900,106
[45] Date of Patent: Feb. 13, 1990

[54] POWER TRANSMISSION OF A TURNING-TRACK TRACK-LAYING VEHICLE

[75] Inventor: Jorma Pohjola, Oulu, Finland
[73] Assignee: Reta-Myynti Ky, Finland
[21] Appl. No.: 235,874
[22] PCT Filed: Dec. 18, 1986
[86] PCT No.: PCT/FI86/00152
 § 371 Date: Aug. 16, 1988
 § 102(e) Date: Aug. 16, 1988
[87] PCT Pub. No.: WO88/04627
 PCT Pub. Date: Jun. 30, 1988
[51] Int. Cl.⁴ .......................................... B62D 55/12
[52] U.S. Cl. ........................................ 305/57; 305/16; 305/24; 180/9.44; 384/49; 464/167
[58] Field of Search ............... 180/9.1, 9.44; 305/16, 305/17, 18, 35 R, 35 EB, 39, 56, 57, 21, 24; 384/43, 49; 464/167; 301/128, 1

[56] References Cited

U.S. PATENT DOCUMENTS

| 754,409 | 3/1904 | Beckwith . | |
|---|---|---|---|
| 3,548,962 | 12/1970 | Best | 180/9.44 |
| 3,893,526 | 7/1975 | Esch | 305/30 X |
| 3,934,664 | 1/1976 | Pohjola | 180/9.44 |
| 3,934,943 | 1/1976 | Gage | 180/9.44 |
| 4,046,429 | 9/1977 | Pohjola | 305/35 EB |
| 4,119,356 | 10/1978 | Pohjola | 305/35 EB |
| 4,188,076 | 2/1980 | Pohjola | 305/29 |
| 4,405,026 | 9/1983 | Merrifield | 180/9.62 |
| 4,442,913 | 4/1984 | Grinde | 305/21 X |
| 4,502,560 | 3/1985 | Hiastomi | 305/24 X |
| 4,705,491 | 11/1987 | Anderson | 464/167 |

FOREIGN PATENT DOCUMENTS 51308 8/1976 Finland .
54259 7/1978 Finland .

Primary Examiner—Russell D. Stormer
Attorney, Agent, or Firm—Steinberg & Raskin

[57] ABSTRACT

The invention relates to a power transmission of a turning-track track-laying vehicle. The track-laying vehicle comprises such a closed-loop type track belt (10) arranged between end rolls or similar (11, 12) in such a way that one edge of the track belt can be stretched and the other edge of the track belt contracted in order to make the vehicle execute a turn. The vehicle comprises a motor (26), a traction sprocket or sprockets (30), and power transmission equipment between the traction sprocket or sprockets (30) and the motor (26). The drive sprocket or sprockets (30) are positioned above the top run of the track belt (10), preferably sideways in its middle range. In the traction sprocket or sprockets (30) there are drive cogs (32) or similar, which drive cogs (32) are in driving contact with the openings (40), grooves or similar of the track belt, so that the traction force can be transmitted from the traction sprocket or sprockets (30) to the track belt (10). The drive fit between the upper run of the track belt (10) and the traction sprocket or sprockets (30), such as a cog fit, is such that the fit lets the traction sprocket or sprockets (30) and the track belt (10) to interactively take such a driving position, which is mainly determined by the curvature of the the track belt.

15 Claims, 4 Drawing Sheets

POWER TRANSMISSION OF A TURNING-TRACK TRACK-LAYING VEHICLE

BACKGROUND OF THE INVENTION

The present invention relates to power transmission of a turning-track track-laying vehicle, in which there is a closed-loop type track belt arranged between end rolls or similar in such a way that one edge of the track belt can be stretched and the other edge of the track belt contracted in order to make the vehicle execute a turn, which vehicle comprises a motor, a traction sprocket or sprockets, and power transmission equipment between the traction sprocket or sprockets and the motor, which drive sprocket or sprockets are positioned above the top run of the track belt, preferably sideways in its middle range, and in which traction sprocket or sprockets there are drive cogs or similar, which drive cogs are in driving contact with the openings, grooves or similar of the track belt, so that the traction force can be transmitted from the traction sprocket or sprockets to the track belt.

The object of the present invention is to provide such transmission for a turning-track vehicle, by means of which the power is transmitted from a motor which is specifically located outside the track-belt loop to drive the track belt so that the track belt may be more advantageously curved than before, and that the previously noted drawbacks, which will be discussed below, can be avoided.

The present invention may be used in all turning-track vehicles, either in those in which either the front end or the rear end of the track belt is forcedly controlled, or in those in which both ends are controlled by stretching one side of the track belt and by contracting the other edge in a similar way.

In the Prior Art, in turning-track vehicles, whose motor and power transmission are located outside the track belt loop, such an axially fixed traction sprocket is used which is positioned above the upper run of the track belt in its center area. In known transmission systems which lateral forces have been created to the side walls of the traction sprocket or sprockets; the forces are the higher the sharper is the bend and higher is the traction force of the vehicle. Said fixed traction sprocket or sprockets have also considerably increased the steering forces because the "tight" fit of the traction openings prevents the upper run of the track belt from adjusting itself in the position required by the turning radius of the vehicle.

SUMMARY OF THE INVENTION

The object of the present invention is to eliminate all these drawbacks by means of a simple and reliable transmission arrangement.

For attaining the objectives mentioned above and to be described later, the principal characteristic feature of the invention is that the drive fit between the upper run of the track belt and the traction sprocket or sprockets, such as a cog fit, is such that the fit lets the traction sprocket or sprockets and the track belt to interactively take such a driving position, which is mainly determined by the curvature of the the track belt.

As, in accordance with the invention, the traction sprocket or sprockets can move in the axial direction, or when the contacting parts of the traction sprocket or sprockets and the traction point of the track belt are so fitted that the traction sprocket or sprockets and the traction belt can, at the traction point, take interactive positions substantially freely and without lateral tensions or rotate around an upright axis, the longevity and functionality of the transmission structures and the track belt will be considerably better than before, and the steering forces will be lower than before, as the upper run of the track belt is free to take lateral position also at small turning radii (sharp bends). Such an arrangement can also be favorably used in the invention, in which for instance the rear end of the track belt and its rear end roll, near which the traction sprockets should preferably be, can freely move and freely take the lateral position necessitated by the turning radius of the vehicle. In this case the rear end roll of the vehicle can be mounted with bearings to the frame section, which is mounted by vertical joints to the frame structures of the vehicle.

BRIEF DESCRIPTION OF THE DRAWINGS

The invention will now be described in detail, by way of examples only, with reference to the figures in the accompanying drawing, with no intention to restrict the invention to these details. In the drawings.

DESCRIPTION OF THE PREFERRED EMBODIMENTS

Figure 1:
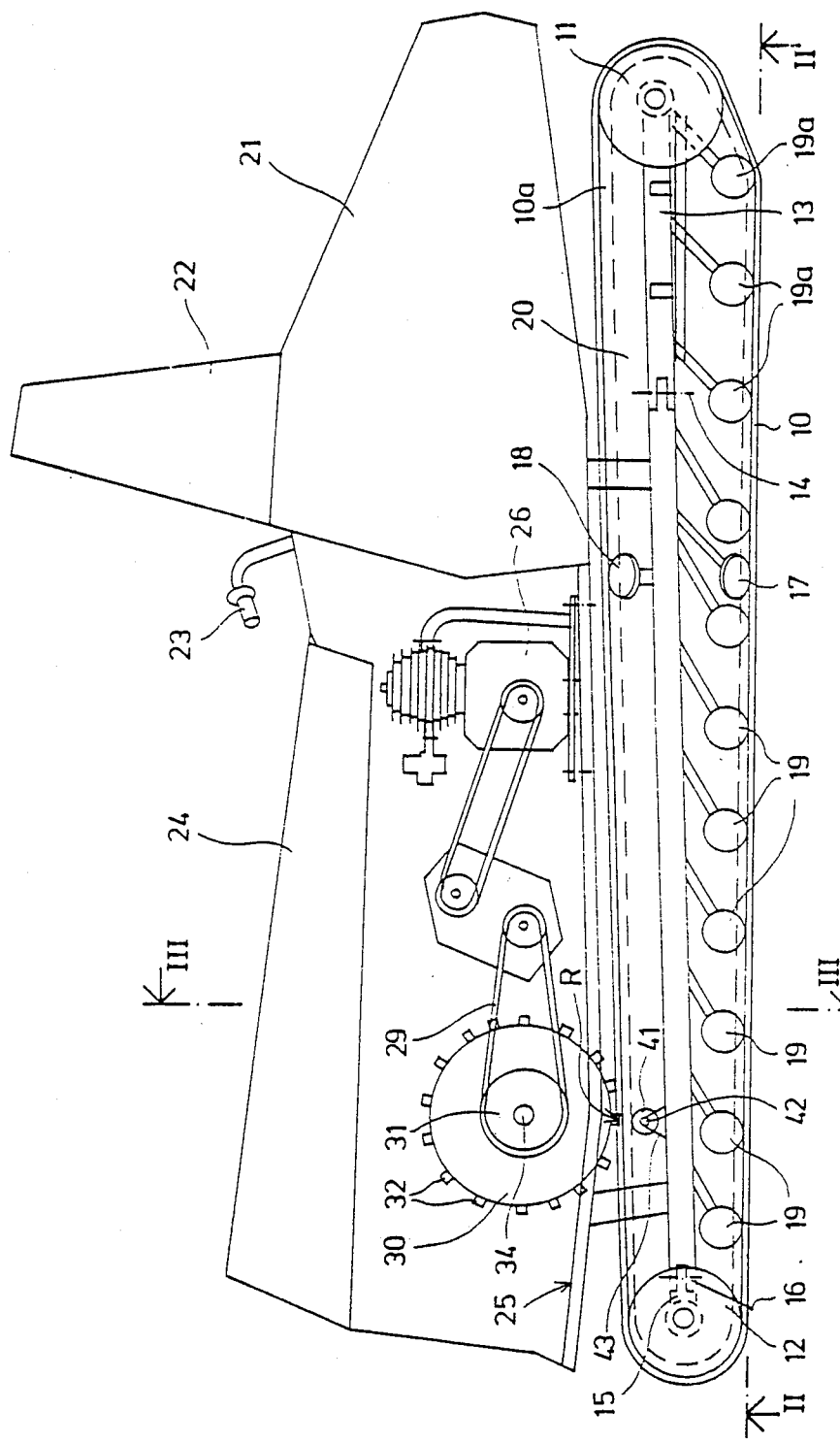
FIG. 1 is a schematic side view of a snowmobile equipped with power transmission in accordance with the invention.
Figure 2:
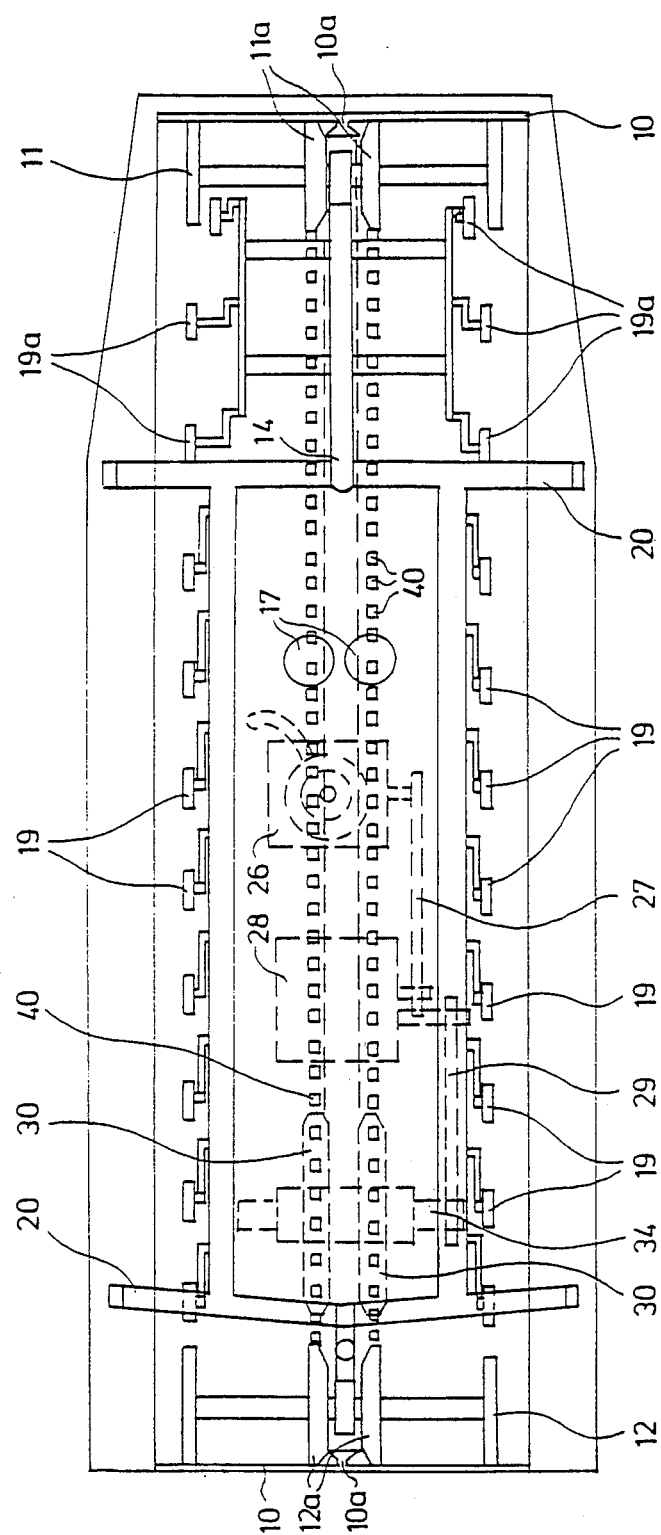
FIG. 2 is the horizontal section II—II in FIG. 1.

The turning-track vehicle shown in FIGS. 1 and 2 comprises a track belt 10, whose structural details are discussed for instance in the inventor's U.S. Pat. Nos. 3,934,664; 4,046,429; 4,119,356; 4,188,176 and Finish Pat. Nos. 51308 and 54259. The track belt 10 is installed between the end rolls 11 and 12. The foremost end roll is mounted with bearings to a turning frame section 13, in which there are bogie wheel units 19a supporting the front section of the bottom run of the track belt. The turning frame section 13 is connected to the frame section 20 of the vehicle with an upright joint 14. The turning frame section 13 is turned, in order to make the track belt curved for steering the vehicle, by means of steering mechanisms known as such (not shown) and by handlebars 23. The rearmost end roll 12 is mounted with bearings to the frame section 15. The frame section 15, for its part, is mounted pivotally with an upright joint 16 to the frame section of the vehicle so that the rearmost end roll 12 can relatively freely take the position determined by the curved track belt 10. If required, the rearmost end roll 12 can also be arranged to be turned about a joint 16 or similar by means of turning mechanisms.

The vehicle illustrated in FIG. 1 comprises a body 21, a windshield 22, handlebars 23, a seat 24, and footsteps 25 on the both side of the seat, all these parts known as such.

The vehicle comprises a motor 26, fastened to the frame section 20. A sprocket wheel fastened to the shaft of the motor drives a chain 27. Said chain 27 drives the primary shaft of the gearbox 28. The secondary shaft of the gearbox 28 drives, by means of a chain 29 and a sprocket 31, traction sprockets 30, of which there are one, two, or several side by side on the drive shaft 34. In the figures there are two parallel traction sprockets 30. The drive shaft is mounted with bearings 36 to the casing 33 of the traction sprocket unit, which is the most clearly shown in FIG. 3.

In traction sprocket or sprockets 30 there are cogs 32 meshing the traction opening rows 40, 40' or similar grooves, slots etc., located on both sides of the lateral support area 10a of the track belt 10.

In accordance with this invention, the drive fit between the traction sprocket or sprockets 30 and the track belt 10 is such that it lets the track belt substantially freely take a curved position, lateral position, and/or rotational position as required by the turning radius. Thanks to the fit in accordance with the invention, there will be no detrimental axial forces or movements applied to the traction sprocket unit, the track belt, or the power transmission equipment, which would quickly wear out the parts of the power transmission system, and possibly cause malfunction.

Figure 3:
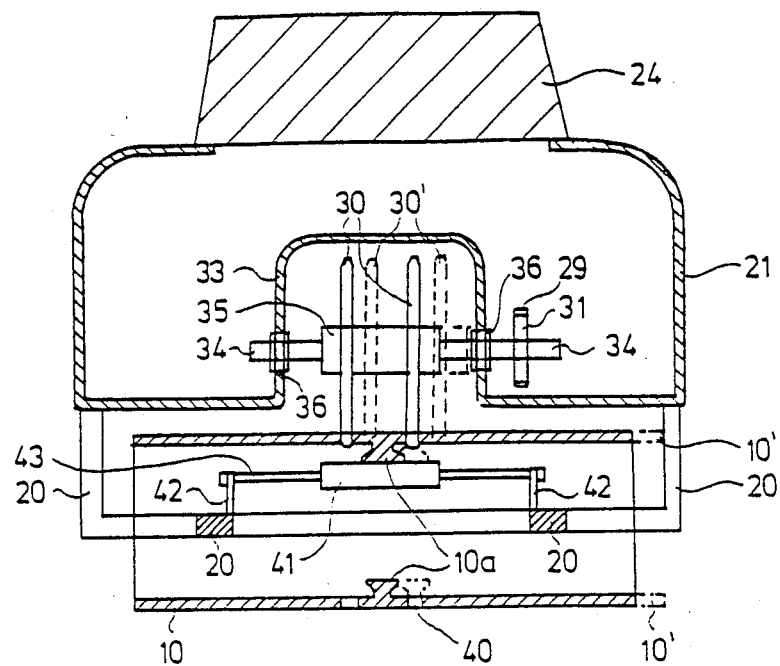
FIG. 3 is the vertical section III—III in FIG. 1.

FIG. 3 shows such an application of the invention, in which the fitting of the cogs 32 of the traction sprockets 30 and the traction openings 40 of the track belt 10 is, in the lateral direction, essentially "tight", so that when the track belt 10 moves to the side position indicated in FIG. 3 with ref. 10' and phantom lines, the traction sprockets 30 can also move on the shaft 34 to the side position 30', although the shaft 30 is installed with bearings 36 to casing 33 so that it cannot move axially, so that the traction sprocket 31 does not move in the axial direction.

The traction sprocket or sprockets 30 is/are so arranged on the drive shaft 34, that the traction sprocket or sprockets 30 can axially move to a position generally determined by the track belt 10. The traction sprocket or sprockets is/are also arranged to turn about an essentially horizontal or upright axis, to a position determined by the degree of curvature of the track belt 10.

Figure 4:
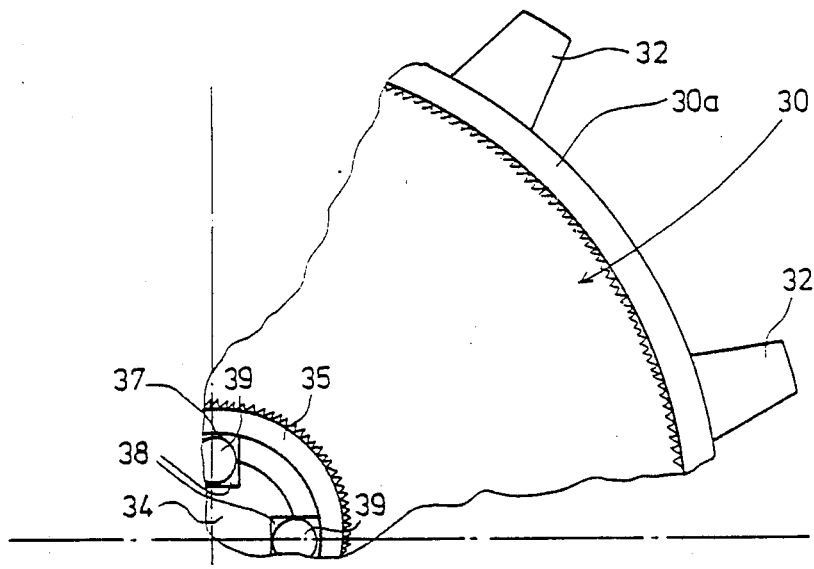
FIG. 4 illustrates a section of a traction sprocket, meshing the upper run of the track belt, used in a power transmission system in accordance with the invention.
Figure 5:
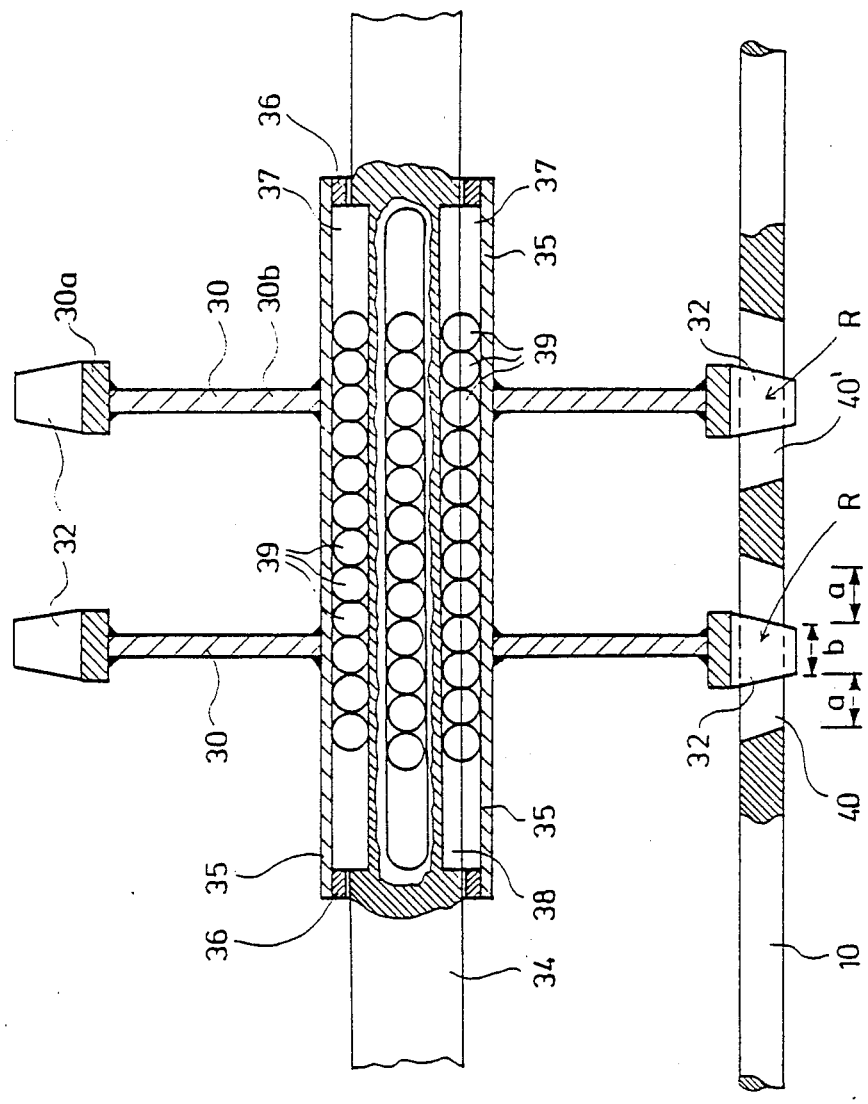
FIG. 5 shows a central axial upright section of a power transmission system in accordance with the invention.

Another, more precise exemplary embodiment of an axially selfadjusting adjusting fit between the traction sprockets 30 and the shaft 34 is illustrated in FIGS. 4 and 5. In accordance with these figures, the traction sprockets 30 comprise, on their outer diameter, an annular section 30a, to which the traction cogs 32 are fastened. The flange 30b of the traction sprockets is welded to the sleeve part 35, inside which there is for instance four axial grooves 37. In the shaft 34, there are similar grooves 38 in the corresponding positions. In the opposite grooves 37, 38 there are balls 39, which transmit torque from shaft 34 to the sleeve part 35 and further on to the traction sprockets 30. At the ends of the sleeve part 35 there are seals 36. The number of balls 39 in the grooves 37, 38 is such that the traction sprockets 30 may sufficiently move in the axial direction on the shaft 34, which is fixed in the axial direction, and, when necessary considering the lateral movement of the track belt 10, equipped with thrust bearings.

In other words, there are several axial grooves 38 provided in the drive shaft 34, and there are corresponding internal grooves 37 provided in a fastening sleeve section 35 of the traction sprocket or sprockets 30. Furthermore, there are balls or similar elements in these opposite grooves 37, 38 which transmit torque from the driving shafts 34 to the traction sprocket or sprockets 30, and which let the traction sprockets 30 move axially with respect to the drive shaft 34, as illustrated in FIG. 5.

In addition to or instead of the fit described above, the fit in accordance with the invention between the track belt 10 and the cogs 32 of the traction sprockets 35 can be carried out so that the traction openings 40' of the track belt 10 can be made crosswise elongated and such that they are considerably wider than the traction cogs 32 at the openings 40. In FIG. 5, this is illustrated by measurements a a, which show the free lateral moving clearance of the track belt 10 with respect to the cogs 32 of the traction sprockets 30 to each direction. In this case the traction sprockets 30 can be fastened to the shaft 34 axially fixedly, whereat said dimensioning (measurements a) of the traction openings allows the interactive lateral positioning of the traction sprockets and the track belt. The crosswise width of openings 40' can be for instance so wide that the width b of the cog 32 in the middle of the openings 40' is essentially as large as the above-mentioned dimension a.

Preferably, the width of the traction openings 40' of the traction belt 10 is 2 to 4 times wider than the width b of the traction cog, most preferably approximately three times the width b of the traction cog at the opening thereof.

In FIG. 3 one can see the supporting roll 41 of the transmission, which is mounted with bearings on a shaft 43. The shaft 43 is fastened with flanges 42 to the frame 20. The supporting roll 41 is installed at the meshing point R (see FIG. 1) between the cogs 32 of the traction sprockets 30 and the upper run of the track belt 10 to support the track belt from underneath by means of the outer wall of the lateral support region 10a so that a sufficiently good meshing will be maintained. The supporting roll 31 may, if required, be coated with elastic surface.

Such arrangements are also included within the inventional idea, in which the traction sprocket or sprockets 30 are so fitted that they and possibly their shaft are relatively free to turn about an upright shaft. This rotational freedom may alone be used for attaining the objectives of the invention, or it may be used together with the lateral movement facility of the traction sprocket or sprockets 30.

Therefore, the traction sprocket or sprockets both turn about a substantially horizontal or upright axis and laterally move to a position determined by the degree of curvature of the traction belt 10.

To summarize, the present invention is directed to power transmission of a turning-track, track-laying vehicle, the track-laying vehicle comprising a closed-loop track belt 10 arranged between end rolls or similar elements 11, 12 in a manner such that one edge of the track belt can be stretched and the other edge of the track belt contracted in order to make the vehicle execute a turn. The vehicle comprises a motor 26, a traction sprocket or sprockets 30, and power transmission equipment 27, 28, 29, 31 between the traction sprocket or sprockets 30 and the motor 26. The drive sprocket or sprockets 30 are positioned above the top run of the track belt 10, preferably sideways in a middle range thereof. Cogs 32 or similar elements are provided in the traction sprocket or sprockets 30, these cogs 32 being in driving contact with openings, grooves, or similar apertures 40 of the track belt, so that the traction force can be transmitted from the traction sprocket or sprockets 30 to the traction belt 10.

A drive fit between an upper run of the track belt 10 and the traction sprocket or sprockets 30, such as a cog fit, is such that the fit lets the traction sprocket or sprockets 30 and the track belt 10 interactively take a driving position which is principally determined by the curvature of the track belt.

The various details of the invention may vary within the inventional concepts set forth alone.

I claim:

1. Power transmmission of a turning-track, track-laying vehicle, said track-laying vehicle comprising a closed-loop type track belt arranged between end rolls, in a manner such that one edge of the track belt can be stretched and the other edge of the track belt contracted in order to cause the vehicle to execute a turn,
    said vehicle comprising a motor, at least one traction sprocket, and power transmission equipment between said at least one traction sprocket and the motor,
    said at least one sprocket positioned above a top run of the track belt and being provided with drive cogs, which are in driving contact with openings or grooves in the track belt, such that traction force can be transmitted from said at least one traction sprocket to the track belt,
    wherein a drive fit between the upper run of the track belt and said at least one traction sprocket is such that said fit allows the at least one traction sprocket and the track belt to interactively take a driving position which is principally determined by curvature of the track belt,
    said drive fit being a cog fit, and
    lateral width of the traction openings or grooves in the track belt being considerably wider than width of the traction cogs at the openings or grooves thereof, such that the track belt can laterally move with respect to the traction cogs.

2. The combination of claim 1, wherein the width of the traction opening or grooves of the traction belt is 2 to 4 times wider than the width of the traction cog.

3. The combination of claim 2, wherein the width of the traction openings or grooves of the traction belt is approximately three times the width of the traction cog at the opening or groove.

4. The combination of claim 1, wherein said at least one sprocket is positioned sidewardly in a middle area of the track belt.

5. The combination of claim 1, additionally comprising a plurality of sprockets.

6. The combination of claim 1, wherein the at least one traction sprocket is arranged on a drive shaft therefor, such that said at least one sprocket can axially move to the position generally determined by the track belt.

7. The combination of claim 1, wherein the at least one traction sprocket is arranged to turn about an essentially horizontal or upright axis, to the position determined by the degree of curvature of the track belt.

8. The combination of claim 1, wherein the at least one traction sprocket both turns about an upright or horizontal axis, and laterally moves to the position determined by the degree of curvature of the track belt.

9. Power transmission of a turning-track, track-laying vehicle, said track-laying vehicle comprising a closed-loop type track belt arranged between end rolls in a manner such that one edge of the track belt can be stretched and the other edge of the track belt contracted in order to cause the vehicle to execute a turn,
    said vehicle comprising a motor, at least one traction sprocket, and power transmission equipment between said at least one traction sprocket and the motor,
    said at least one sprocket being positioned above a top run of the track belt and being provided with drive cogs, said drive cogs being in driving contact with openings or grooves of the track belt, such that traction force can be transmitted from the at least one traction sprocket to the track belt,
    wherein a drive fit between the upper run of the track belt and the at least one traction sprocket is such that the fit allows the at least one traction sprocket and the track belt to interactively take a driving position which is principally determined by curvature of the track belt,
    said at least one sprocket is arranged on a drive shaft, there being several axial grooves in the drive shaft,
    said at least one traction sprocket comprises a fastening sleeve in which there are corresponding internal grooves, and
    balls are situated in said opposite grooves, which transmit torque from the driving shaft to the at least one traction sprocket, and allow the at least one traction sprocket to axially move with respect to the drive shaft.

10. The combination of claim 9, wherein said at least one sprocket is positioned sidewardly in a middle area of the track belt.

11. The combination of claim 9, additionally comprising a plurality of sprockets.

12. The combination of claim 9, wherein said at least one traction sprocket is arranged on a drive shaft therefor, such that the at least one traction sprocket can axially move to the position generally determined by the track belt.

13. The combination of claim 9, wherein the at least one traction sprocket is arranged to turn about an essentially horizontal or upright axis, to the position determined by the degree of curvature of the track belt.

14. The combination of claim 9, wherein the at least one traction sprocket both turns about a horizontal or upright axis, and laterally moves to the position determined by the degree of curvature of the track belt.

15. The combination of claim 9, wherein said drive fit is a cog fit.

* * * * *